No. 609,324. Patented Aug. 16, 1898.
J. H. ATKINSON.
WRENCH.
(Application filed Dec. 15, 1897.)
(No Model.)
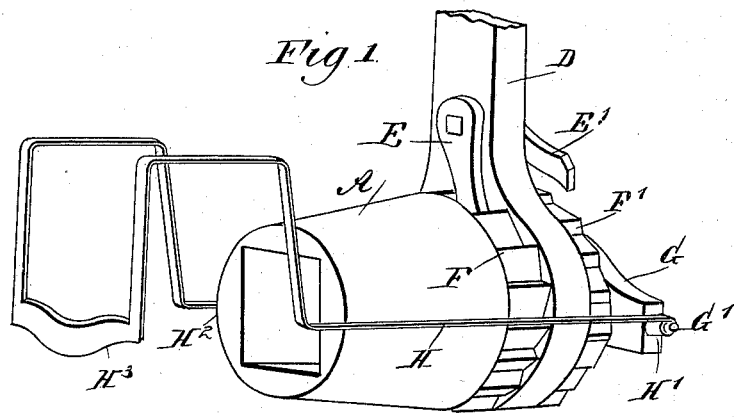
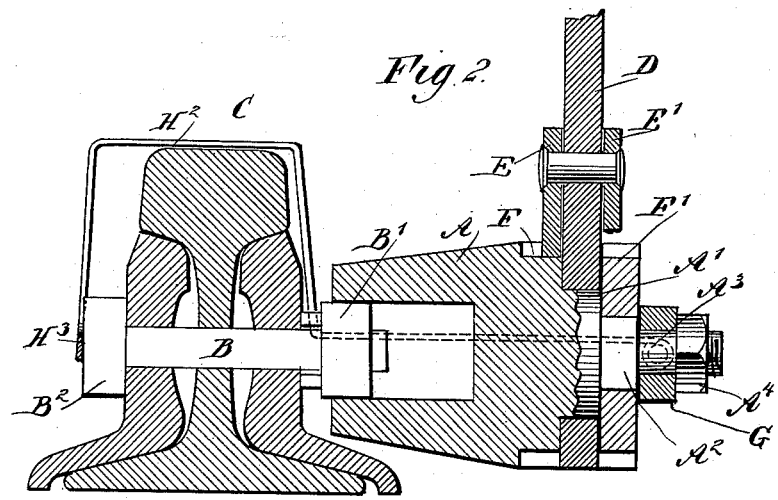
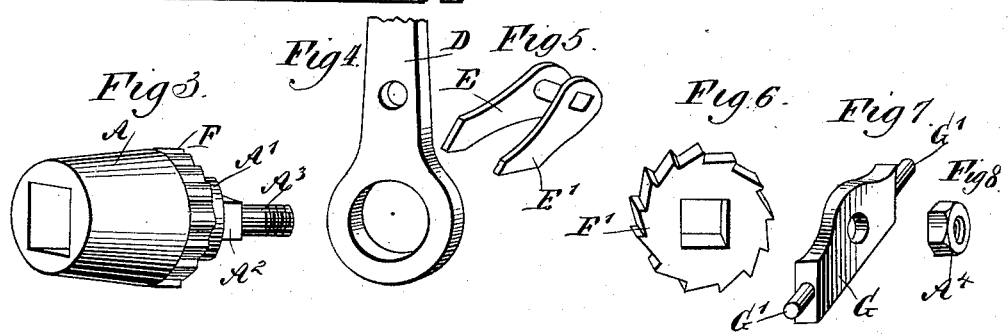
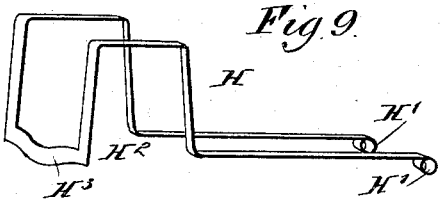
WITNESSES:
INVENTOR
J. H. Atkinson
BY
ATTORNEYS

UNITED STATES PATENT OFFICE.

JOHN H. ATKINSON, OF WINNEBAGO, MINNESOTA.

WRENCH.

SPECIFICATION forming part of Letters Patent No. 609,324, dated August 16, 1898.

Application filed December 15, 1897. Serial No. 661,998. (No model.)

*To all whom it may concern:*

Be it known that I, JOHN H. ATKINSON, of Winnebago city, in the county of Faribault and State of Minnesota, have invented a new and Improved Wrench, of which the following is a full, clear, and exact description.

The object of the invention is to provide a new and improved wrench which is simple and durable in construction, easily applied, and more especially designed for use as a clamping-wrench to prevent a bolt from turning while screwing up or unscrewing a nut.

The invention consists of novel features and parts and combinations of the same, as will be fully described hereinafter and pointed out in the claims.

Reference is to be had to the accompanying drawings, forming a part of this specification, in which similar characters of reference indicate corresponding parts in all the figures.

Figure 1 is a perspective view of the improvement. Fig. 2 is a cross-section of a rail-joint with the improvement applied and also in cross-section; and Figs. 3 to 9, inclusive, are perspective views of the various parts forming the wrench.

The improved wrench is provided with a wrench-head A, formed with a polygonal opening for engaging the nut B' of a bolt B, used for fastening the several parts of a rail-joint C together, as is illustrated in Fig. 2. The outer end of the head A is formed with a reduced cylindrical portion A', the axis of which coincides with the center of the opening and the bolt B, and on this reduced portion is fulcrumed loosely a lever D, carrying on opposite sides pawls E E', adapted to engage ratchet-wheels F F', respectively, having their teeth standing in opposite directions, the ratchet-wheel F being formed integrally on the head A and the ratchet-wheel F' fitted on a reduced square offset $A^2$, formed on the head A. The pawls E E' extend in opposite directions corresponding to the teeth of the ratchet-wheels, and either of the pawls can be thrown in or out of mesh with its ratchet-wheel, according to the direction in which the head A is to be turned, to screw up or unscrew the nut B' on the bolt B.

Now it is evident that when a pawl E or E' is in mesh with a ratchet-wheel F or F', respectively, and the operator imparts a swinging motion to the lever D then the corresponding pawl E or E' imparts a turning motion to the head A by engaging the corresponding ratchet-wheel, so that the nut B' is turned and screwed up or unscrewed on the bolt B.

Next to the offset $A^2$ is formed a reduced threaded portion $A^3$ on the outer end of the head A, and on this threaded portion is fitted a yoke G, secured in place by a nut $A^4$, screwing on the threaded portion, the yoke serving to hold the ratchet-wheel F' in place and also to carry a clamp H, formed with two side bars terminating in eyes H', engaging trunnions G', formed on the ends of the yoke G, so that the clamp H is free to swing up or down on the said trunnions as the fulcrum.

The clamp H is formed at its free end into a U-shaped portion $H^2$, adapted to straddle the rail-joint, as plainly indicated in Fig. 2, the extreme outer end $H^3$ of the clamp engaging the outer face of the head $B^2$ of the bolt B, so as to prevent the latter from turning while screwing up or unscrewing the nut B', such action being due to the friction existing between the parts $B^2$ and $H^3$.

Now it will be seen that by the arrangement above mentioned the nut B' can be readily screwed up or unscrewed, and the bolt B is held from turning by the clamp H, which can be readily swung into and out of place as described, the U-shaped portion straddling the rail-joint, as illustrated in the drawings.

Having thus fully described my invention, I claim as new and desire to secure by Letters Patent—

1. A wrench provided with a head adapted to engage a nut, a lever fulcrumed loosely on the head, and carrying two pawls extending in opposite directions, ratchet-wheels on the said head, and adapted to be engaged by the said pawls, to turn the head and screw up or unscrew the nut, a clamping device comprising a yoke carried by the said head, and a clamp held on the said yoke, and formed with a U-shaped portion adapted to straddle a rail-joint and to engage the head of a bolt, substantially as shown and described.

2. The combination of a wrench-head, having a ratchet-wheel formed thereon and having a reduced portion projecting outwardly from the said ratchet-wheel, a lever mounted to turn on the reduced portion, a second ratchet-wheel mounted on the reduced portion and lying against the outer side of the lever, two pawls carried on the lever and respectively engaging the ratchet-wheels, a yoke carried loosely on said reduced portion and outward from the second ratchet-wheel, and a clamp pivotally connected with the ends of the yoke and capable of engaging a bolt to prevent the turning of the same under the action of the wrench-head.

3. The combination of a wrench-head, means by which to turn the wrench-head, a yoke mounted loosely on the wrench-head and projecting beyond each side thereof, and a swinging clamp mounted directly on the ends of the yoke and projecting longitudinally with the wrench-head beyond the same and capable of engaging a bolt to prevent the bolt from turning.

JOHN H. ATKINSON.

Witnesses:
E. E. CRANDALL,
J. D. H. PAINTER.